United States Patent [19]

Tseng et al.

[11] Patent Number: 5,159,630
[45] Date of Patent: Oct. 27, 1992

[54] FACSIMILE MESSAGE ENCRYPTION SYSTEM

[75] Inventors: Ling-Yuan Tseng, Taipei; Min-Chih Hsuan, Hsin Chu; Sheng-Wen Hong, Taipei, all of Taiwan

[73] Assignee: International Communication Systems Corporation, Hsinchu, Taiwan

[21] Appl. No.: 707,071

[22] Filed: May 29, 1991

[51] Int. Cl.⁵ .............................................. H04N 1/44
[52] U.S. Cl. ...................................... 380/18; 380/49; 380/50; 379/100; 358/483
[58] Field of Search ............... 380/18, 49, 50; 379/95, 379/100; 358/450, 483

[56] References Cited

U.S. PATENT DOCUMENTS

| | | | |
|---|---|---|---|
| 4,454,575 | 6/1984 | Bushaw et al. | 380/18 X |
| 4,694,352 | 9/1987 | Ina et al. | 379/100 X |
| 4,901,068 | 2/1990 | Benton et al. | 379/95 X |
| 4,985,919 | 1/1991 | Naruse et al. | 380/18 |
| 4,989,244 | 1/1991 | Naruse et al. | 380/18 X |

OTHER PUBLICATIONS

"Facsimile with encrypted hard copy"; R A Meyers et al.; IBM Technical Disclosure Bulletin; vol. 20 No. 11B, Apr. 1978 pp. 4994–4995.

Primary Examiner—Tod Swann
Attorney, Agent, or Firm—Burns, Doane, Swecker & Mathis

[57] ABSTRACT

A system for maintaining the security of information transmitted between facsimile machines includes a transmitting/receiving facsimile machine for receiving input sheets having an encryption zone; an image sensor for detecting the encryption zones; an encryption device for scrambling messages that appear within an encryption zone. Further the system includes means for sensing encryption zones on transmitted messages and for decoding messages that have been scrambled within the encryption zones.

13 Claims, 2 Drawing Sheets

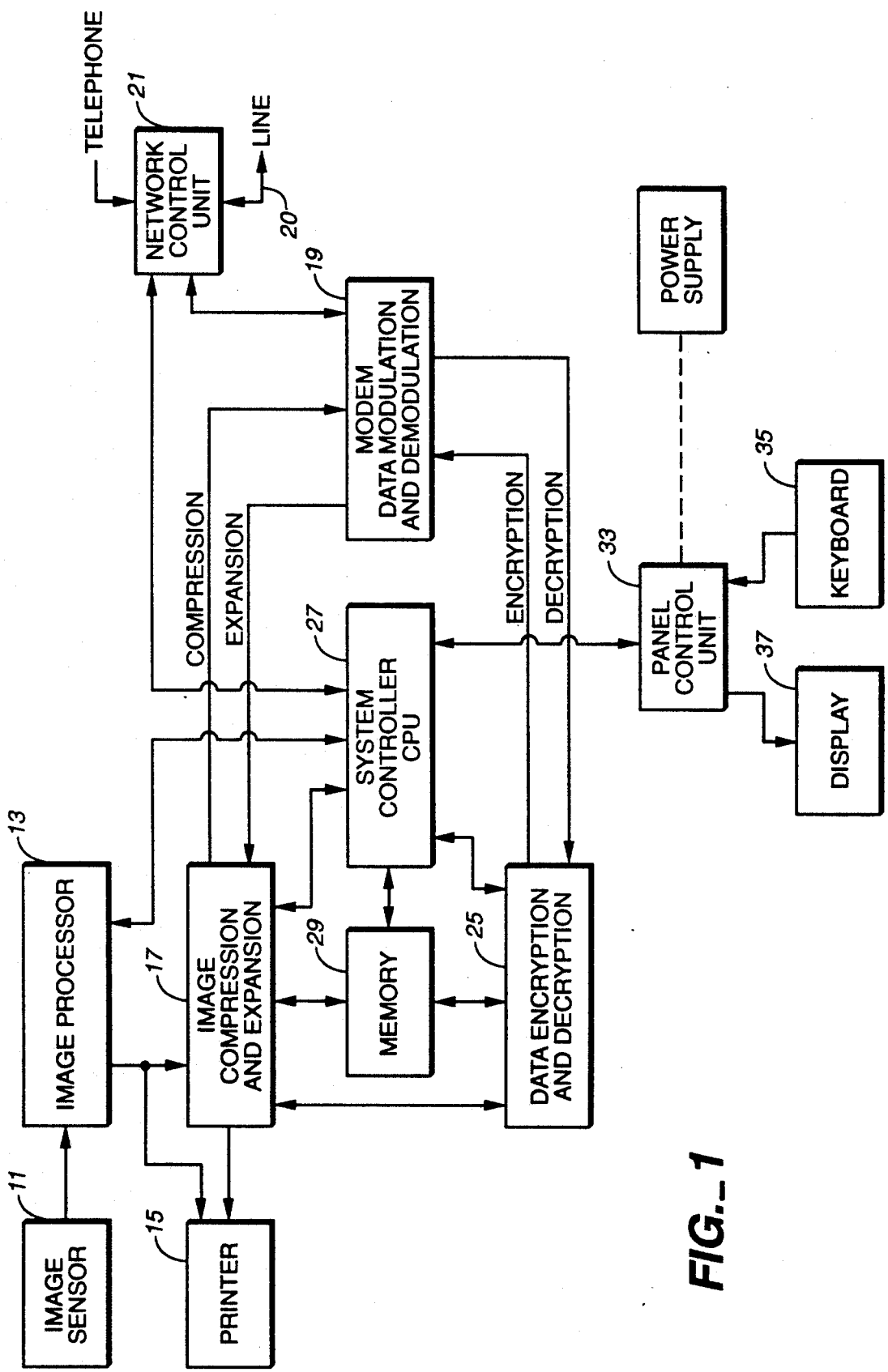
FIG._1

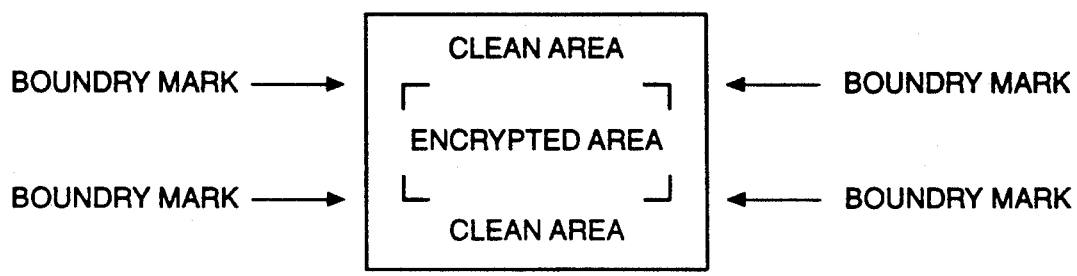
FIG._2
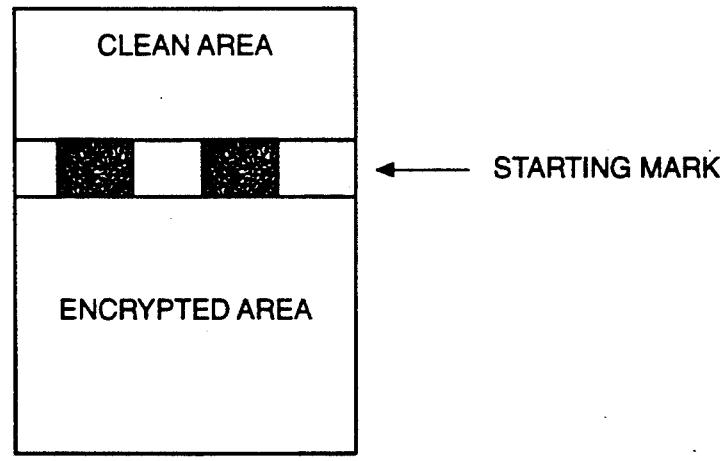
FIG._3

FACSIMILE MESSAGE ENCRYPTION SYSTEM

BACKGROUND OF THE INVENTION

1. Field of the Invention

The present invention relates to systems for maintaining the security of information transmitted between facsimile machines.

2. State of the Art

It is well known to use ciphering procedures for protecting the security of confidential information. In conventional ciphering systems, a dedicated algorithm—usually a rather complicated formula—is employed for transmitting complete messages in encrypted or "scrambled" form. Further in such systems, an intended receiver employs a "key algorithm" for deciphering the scrambled messages. If a receiver does not have the key algorithm, the receiver either cannot receive information or it receives the information in a meaningless scrambled form.

Although encryption procedures have the benefit of increasing the security with which information can be transmitted, those procedures decrease transmission efficiency and speed. The penalty in terms of transmission speed usually is referred to as "overhead." In practice, overhead can create substantial transmission costs.

BRIEF SUMMARY OF THE PRESENT INVENTION

Generally speaking, the present invention provides systems for maintaining the security of information transmitted between facsimile machines. In the preferred embodiment, a security system according to the present invention comprises:

a transmitting/receiving facsimile machine;

input sheet means having an encryption zone;

image sensor means for detecting the encryption zone;

encryption means for scrambling messages that appear within an encryption zone; and transmission means for transmitting encrypted messages to the receiving facsimile machine.

Further in the preferred embodiment, a security system according to the present invention comprises, at the receiving facsimile machine, means for sensing encryption zones on transmitted messages and decoding means for decoding messages that have been scrambled within the encryption zones.

BRIEF DESCRIPTION OF THE DRAWINGS

The present invention can be further understood with reference to the following description in conjunction with the appended drawings, wherein like elements are provided with the same reference numerals. In the drawings:

FIG. 1 is a functional block diagram of a security transmitting/receiving facsimile machine according to the present invention;

FIG. 2 is a plan view of one example of an input sheet having a designated encryption zone; and FIG. 3 is a plan view of another example of an input sheet having a designated encryption zone.

DETAILED DESCRIPTION OF THE PREFERRED EMBODIMENT

FIG. 1 shows a transmitting/receiving facsimile machine 1 for providing security for transmitted facsimile information. In the illustrated embodiment, the transmitting/receiving machine includes an image sensor 11 whose output is provided to an image processor 13. In practice, the image sensor and the image processor are conventional devices that operate to convert patterns—such as text, drawing, and pictures—into electronic digital signals. The image sensor can be, for example, a charge coupled device or a contact-image sensor.

Further in the embodiment shown in FIG. 1, the image processor 13 is connected to provide digital electronic signals to a printer 15. The printer, in practice, is a thermal printer, a laser printer, an inkjet printer, or a dot matrix printer. The image sensor and the printer need not be in the same housing as the facsimile machine, but can be cable-connected to it.

As also shown in FIG. 1, output signals from the image processor 13 are provided to an image compression/expansion module 17. In practice, the image compression/expansion module 17 is a conventional analog-to-digital (A/D) convertor. Depending upon the desired complexity of the facsimile transmitting/receiving machine, the A/D convertor can be designed to encode the information various levels. For example, the A/D convertor can convert the information to 16 level, 32 level, or 64 level grey scales.

When the transmitting/receiving machine operates to transmit information, the image compression/expansion module 17 compresses the data that it receives from the image processor 13. On the other hand, when the transmitting/receiving machine operates to receive information, the image compression/expansion module 17 expands the data that it receives from a modem 19. In practice, the modem 19 is a conventional device for modulating and demodulating ordinary telephone signals.

As also shown in FIG. 1, a network control unit 21 connects the modem 19 to a telephone line 20. The network control unit is also connected to a system controller 27. The system controller normally is a dedicated microprocessor that operates as a central processing unit (CPU). Also in practice, the system controller includes memory 29 comprising both conventional RAM and ROM memory.

In operation, the control unit 21 provides received data signals to the modem 19 which, in turn, provides those signals either to the image compression/expansion module 17 (for expansion) or to a data encryption/decryption module 25 (for encryption). The decision as to whether the modem 19 provides the data signals to the image compression/expansion module 17 or to the data encryption/decryption module 25 is determined by the system controller 27.

Further in the system in FIG. 1, the image compression/expansion module 17 and the data encryption/decryption module 25 are connected so that signals can be sent back and forth between the two modules. Also, the system controller 27 is connected for sending signals to, and receiving signals from, the image compression/expansion module 17. Further, the system controller 27 is connected for sending signals to, and receiving signals from, the data encryption/decryption module 25. Similarly, the memory means 29 sends and receives signals from both the image compression/expansion module 17 and the data encryption/decryption module 25. Still further, the system controller 27 is connected to a panel control unit 33 having a keyboard 35 for the input of data, and a display 37 for displaying the data.

A particular function of the image sensor devices in the system of FIG. 1 is to recognize specially marked "encryption zones" on input sheets. Within the encryption zones, messages are encrypted for transmission by an encryption unit. Outside the encryption zones—in so-called "clean areas"—messages are not encrypted. Thus, prior to using the system of FIG. 1 for maintaining the security of information transmitted between facsimile machines, a user writes messages to be secured in the encryption zones on the input sheets.

FIG. 2 shows an example of an input sheet 31 having an encryption zone 35 defined by boundary markers 37. In this example, the boundary markers 37 are angular marks. Alternatively, the boundaries of the encryption zone can be designated by solid lines, dotted lines, edge marks, and so forth. The essential point is that the boundary markers provide patterns that can be recognized easily by the image sensor 11.

FIG. 3 shows another example of an input sheet 31. In this example, an encryption zone 35A begins with a boundary and extends to the bottom edge of sheet 31.

To use the system of FIG. 1, a user feeds a sheet containing a message to the image sensor 11. Output signals from the image processor are sent to the image processor 13 and then to the image compression/expansion module 17. Based upon communications between the system controller 27 and the compression/expansion module 17, the sending transmitting/receiving machine operates as an ordinary facsimile machine until the image sensor 11 senses a boundary marker of an encryption zone 35 on an input sheet. That is, prior to sensing a boundary marker of an encryption zone, the messages in the clean zones are read, converted to digital values by the image processor 13 and compressed by the compression/expansion module 17. Then, the output of the compression/expansion module is provided to the modem 19 which provides the messages to telephone line 20 via the network control unit 21.

In the event that the image sensor 11 in the machine of FIG. 1 senses a boundary marker of an encryption zone on an input sheet, the image sensor 11 proceeds to read the message in the encryption zone. The output signals from the image sensor device again undergo analog-to-digital (A/D) conversion by the image processor 13 and the digital values are compressed by the compression/expansion module 17. Following conversion to digital values, encryption begins using a specific algorithm or "key" to produce scrambled information. In practice, encryption can be accomplished by page, by line, or by block, in the batch type operation instead of byte by byte. Encryption continues until an end mark is sensed, at which time the sending transmitting/receiving machine resumes operation as a conventional facsimile machine.

Preferably, the encryption/decryption module 25 is an independent unit that can be connected to a facsimile machine via its input/output ports. (Alternatively, the encryption unit can be integrated into the main control board of a facsimile machine.) Also it is preferred that the encryption unit includes a plurality of user-selectable encryption algorithms for providing selection of the level of security during transmission. In practice, for each encryption algorithm, a different pattern of the scrambled information is created. The encryption algorithm, normally is a series of four or more digits, can be as simple as a random number generator or as complicated as a data encryption standard (DES).

When documents containing encrypted messages are received by a conventional facsimile machine, only scrambled information (i.e., non-meaningful patterns) appears in an encryption zone 35 of a received document. Outside the boundaries of the encryption zone of the documents, non-encrypted messages appear as originally transmitted.

When documents containing encrypted messages are received by a transmitting receiving machine as described above, however, the machine decodes the scrambled information in the encryption zone 35 of a received document. In such cases, a protocol is transmitted between the transmitting and receiving facsimile machines for assuring that the receiving machine applies the proper decoding to encrypted messages. In particular, the receiving machine is notified that the conventional facsimile CCITT protocol will not be followed.

In practice, a user initiates decoding at a receiving machine by keying in an agreed-upon series of digits; alternatively, the decoding key can be inserted into the receiving machine before a message is transmitted. In cases where various levels of securities can be implemented, a protocol setup is sent back and forth between two the transmitting and receiving facsimile machines determines the level of security to be used in particular cases. In practice, the protocol is setup at he common highest level of security. The security level can be designated, for example, it a designated place in an encryption zone.

However, a scrambled message need not be decoded in real time—nor, on-line. Instead, a scrambled message can be decoded at a later time by keying-in a decoding key and running the copy mode at the transmitting-/receiving facsimile machine. Also, the encrypted message can be decoded by another facsimile machine that has been equipped with the above-described security system. Then, by using the "copy" function combined with the decoding key, the original message can be recovered (i.e., decoded).

The above-described invention provides a low-cost and convenient system for maintaining the security of information transmitted between facsimile machines. Thus, even if a facsimile machine is installed in an open office location where the lack of security of the location might compromise the confidentiality of facsimile messages transmitted by the machine, the above-described encryption procedures can protect the security of transmitted messages without incurring expensive overhead. The savings in overhead results from only using designated encryption zones on input sheets.

The foregoing has described the principles, preferred embodiments and modes of operation of the present invention. However, the invention should not be construed as limited to the particular embodiments discussed. Instead, the above-described embodiments should be regarded as illustrative rather than restrictive. Thus, it should be appreciated that variations may be made in the above-described embodiments by workers skilled in the art without departing from the scope of present invention as defined by the following claims.

What is claimed is:

1. A system for maintaining the security of information which is transmitted between facsimile machines, comprising:
a transmitting/receiving facsimile machine;
input sheet means having a visibly-demarked encryption zone of variable size;

image sensor means for detecting a beginning point and an ending point of the encryption zone;

encryption means for scrambling messages that appear within an encryption zone; and transmission means for transmitting encrypted messages to a receiving facsimile machine.

2. A system according to claim 1 wherein the transmitting/receiving facsimile machine includes decoding means for decoding messages that have been scrambled within encryption zones.

3. A system according to claim 2 wherein the decoding means includes means for sensing encryption zones of transmitted messages.

4. A system according to claim 1 wherein, in areas on input sheets outside the encryption zones, messages are not encrypted.

5. A system according to claim 1 including means for notifying the receiving machine that the conventional facsimile protocols will not be followed.

6. A system according to claim 1 including an image processor to receive an output of the image sensor.

7. A system according to claim 6 wherein the image sensor and the image processor operate to convert patterns into electronic digital signals.

8. A system according to claim 7 wherein the image sensor is at least one of a charge coupled device and a contact-image sensor.

9. A system according to claim 7 including an image compression/expansion module for receiving output signals from the image processor.

10. A system according to claim 9 wherein the image compression/expansion module is an analog-to-digital (A/D) convertor.

11. A system according to claim 10 wherein the image compression/expansion module compresses data from the image processor when the transmitting/receiving machine operates to transmit information, and the image compression/expansion module expands data when the transmitting/receiving machine operates to receive information.

12. A system according to claim 1 wherein the transmitting/receiving facsimile machine includes a system controller that operates as a central processing unit and includes memory.

13. A system according to claim 1 wherein the encryption means and the decoding means are embodied in an encryption/decryption module that is an independent unit that can be connected to a receiving/transmitting facsimile machine via its input/output ports.

* * * * *